Feb. 23, 1954
C. SCHÖRNER ET AL
2,670,185
HEAT EXCHANGE APPARATUS PROVIDED WITH
THERMAL COMPENSATING DEVICE
Filed June 13, 1950
2 Sheets-Sheet 1
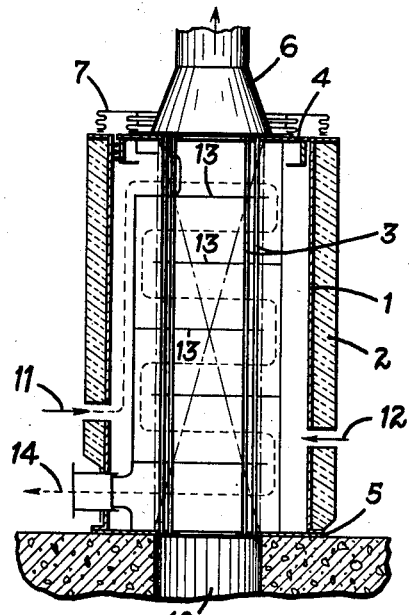
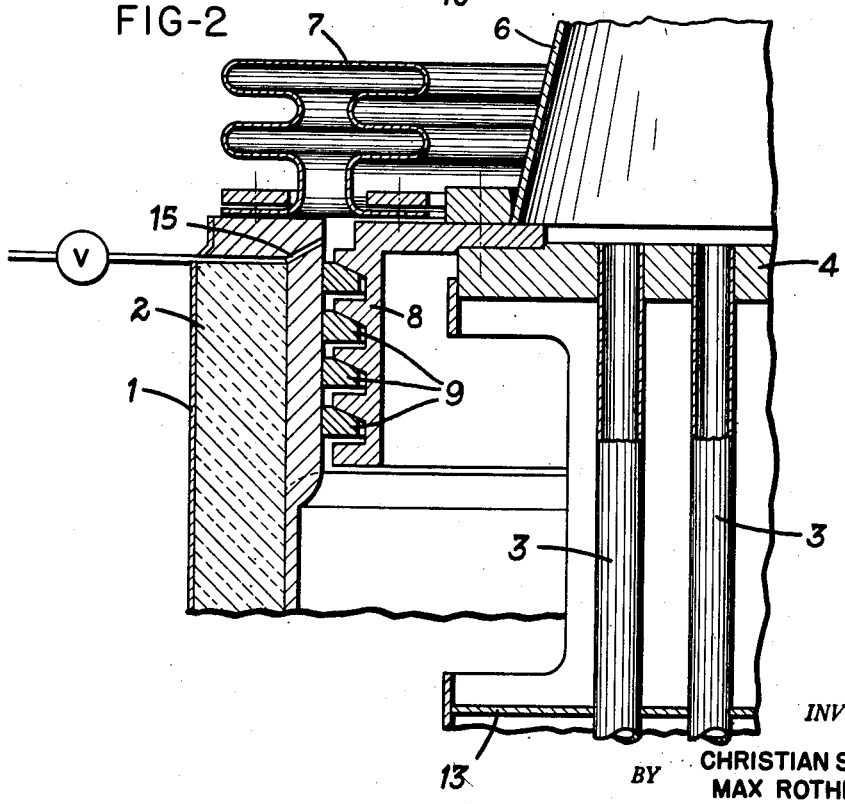
INVENTORS
CHRISTIAN SCHÖRNER &
MAX ROTHEMUND
BY
ATTORNEYS Feb. 23, 1954
C. SCHÖRNER ET AL
HEAT EXCHANGE APPARATUS PROVIDED WITH
THERMAL COMPENSATING DEVICE
2,670,185
Filed June 13, 1950
2 Sheets-Sheet 2
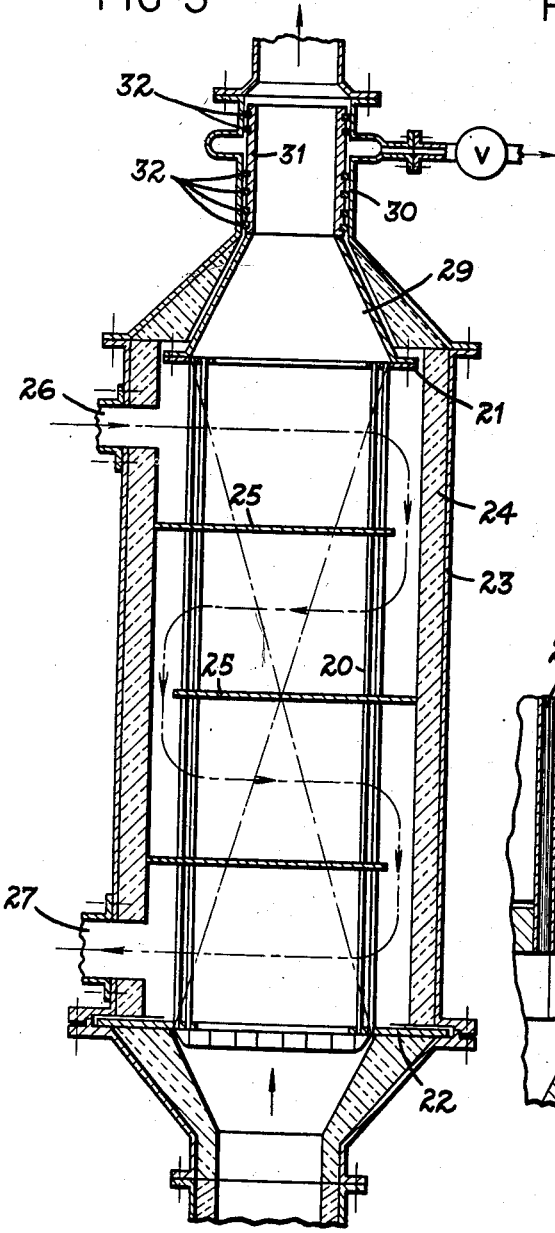
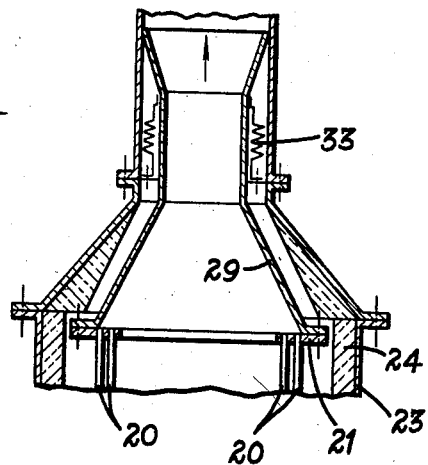
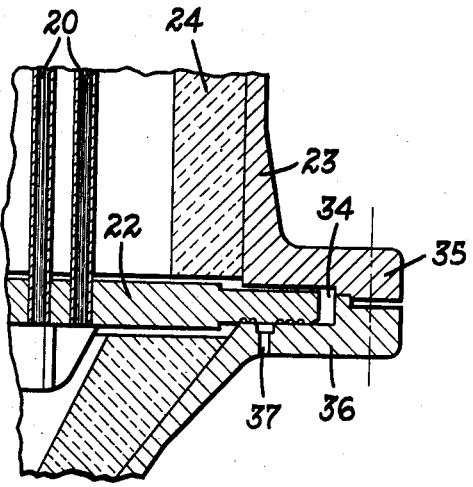
INVENTORS
CHRISTIAN SCHÖRNER &
BY MAX ROTHEMUND
ATTORNEYS Patented Feb. 23, 1954

2,670,185

UNITED STATES PATENT OFFICE 2,670,185

HEAT EXCHANGE APPARATUS PROVIDED WITH THERMAL COMPENSATING DEVICE

Christian Schörner and Max Rothemünd, Augsburg, Germany, assignors to Maschinenfabrik Augsburg-Nurnberg A. G., Augsburg, Germany, a corporation of Germany Application June 13, 1950, Serial No. 167,898

Claims priority, application Germany October 1, 1949

9 Claims. (Cl. 257—224)

1

This invention concerns certain improvements relating to the means for compensating the heat expansions occurring in vessels with high interior pressure and different temperature of the parts of the vessel, and has particular reference to heat exchangers.

It is an object of the present invention to provide means for compensating the heat expansions and the local stresses thereby produced in a pressure vessel consisting, for instance, of a cylindrical outer shell and a nest of tubes beaded or welded into the end bottoms thereof.

In such vessels the interior of the vessel is passed in known manner by the compressed air to be heated up while the interior of the tubes is heated by hot gases of a low pressure. The lower end part of the vessel being held in its position in a longitudinal direction, the heat expansion of the upper tube bottom at the end of the nest of heating tubes must be compensated in relation to the outer cylindrical shell which remains rather cold, by the provision of an elastic member. The known elastic compensating elements so far have proved rather good within certain pressure and temperature limits. However, difficulties are arising where the temperatures and pressures exceed these limits. On the one hand, the inserted expansion elements must have thin walls in order to permit the large expansions caused by the high temperatures; on the other hand, they must stand the high pressures in the interior of the vessel.

It is the object of the present invention to provide a construction avoiding these difficulties.

With this object in view, according to the present invention a series of labyrinth packing elements decreasing the high interior pressure in stages are provided for protecting the expansion element, e. g. the membrane bellows, inserted at the point of maximum difference of expansion, against the high pressure prevailing within the interior of the vessel. In order to attain this effect, a certain leakage loss of the medium under pressure must be tolerated, but this is of an inferior importance. The drop of pressure is controlled by small openings connecting the last labyrinth chamber or the terminal chamber in the expansion element with the outer atmosphere, thereby determining the flow of the medium under pressure through the labyrinth chambers. The throttling points between the single chambers are formed by piston rings or packing laminae whose shape is preferably designed so that either the excess pressure acting upon the packing element or the heat expansion under operating conditions assists the tight engagement

2 of the packing surfaces and thus reduces the leakage loss of the valuable compressed working medium to a minimum. For instance, piston rings may be used for this purpose.

In case of large dimensions of the pressure vessels, e. g., in case of a heat exchanger with a diameter of several meters, however, constructional difficulties may arise in the design of the packing elements (membrane bellows or the like) and of the throttling means (piston rings, labyrinths), which difficulties according to a further feature of the invention are removed in such a way that the constructional elements serving for compensating the relative heat expansion and the packing means serving for throttling the pressure are arranged in one of the gas ducts having a smaller diameter than the shell of the heat exchanger. The gases are collected, for instance, after leaving the nest of tubes, in a conical hood or cap piece passing over into a cylindrical tube length. This cylindrical length of tube has approximately the diameter of the gas discharge tube. Its diameter thus is substantially smaller than the diameter of the shell of the heat exchanger. If this cylindrical extenson protruding into the gas discharge tube is provided with a piston ring packing, an arrangement with a relatively small diameter will be obtained which is very advantageous for the manufacture and the assembly as well as for operation.

Other and further objects, features and advantages of the invention will be pointed out hereinafter and appear in the appended claims forming part of the application.

In the drawings:

Fig. 1 is a diagrammatic view of a heat exchanger, having the invention applied thereto, Fig. 2 is an axial section similar to Fig. 1, but showing only the part of the expansion device marked by a circle in Fig. 1, on a larger scale, Fig. 3 is an axial section through a heat exchanger in which the compensating means are arranged in a part having a small diameter, Fig. 4 is an axial section of another modification of the compensating and packing means, and Fig. 5 is an axial section of the compensating and packing means at the bottom of the vessel corresponding to the zone encircled in Fig. 3.

Referring now to the drawings in greater detail, and first to Figs. 1 and 2, it will be seen that the heat exchanger comprises an outer shell 1 with the heat insulation 2, a nest of tubes 3 which is connected to an upper end plate 4 and to a bottom plate 5 by beading or welding, a gas discharge hood 6, an expansion element 7 and a packing element 8 with piston rings 9. The hot gases enter the heat exchanger from the bottom, at 10, pass through the single tubes of the nest of tubes 3 and leave the heat exchanger through the hood 6. The medium under pressure absorbing the heat, for instance, air, enters at 11 and 12 and comes into contact with the nest of tubes 3, guided by guide walls 13, in a number of flues, whereby the heat is transmitted from one flowing medium to the other, through the walls of the tubes. The heated medium under pressure leaves the heat exchanger at 14. Since the hot nest of tubes 3, of course, expands much more violently than the relatively cold wall 1 of the vessel, the two elements are interconnected, with an interposed packing element 8, by an elastic expansion element 7 in the form of membrane bellows. The thin walls of the expansion element 7 and the corrugated form thereof permit a reliable compensation of the different heat expansions of the wall 1 of the vessel and of the nest of tubes 3. However, in order to permit the use of an expansion element 7 with thin walls, the pressure of the medium to be heated must be kept away from the same as much as possible. This is achieved by the packing element 8 with its piston rings 9, forming throttling means through which the pressure of the medium to be heated up is decreased in steps from the inner towards the outer side, until it has been reduced, in the expansion element 7, to an amount admissible for its wall thickness. The drop of pressure is caused and controlled by openings 15 connecting the last labyrinth chamber with the outer atmosphere and controlling the passage of the pressure medium through the preceding throttling means.

By way of alternative, instead of the piston ring packing any other labyrinth packing may be used. It is only important, having regard to the design thereof, that the packing efficiency is not reduced, but rather increased, by the relative expansion movement of the parts of the vessel.

Fig. 3 shows an expansion and packing device for pressure vessels of larger dimensions. The general construction of the heat exchanger is the same as in Fig. 1. A nest of tubes 20 is arranged between plates 21 and 22 and in the interior of a pressure vessel consisting of the shell 23 and the insulation 24. Guided by transverse partitions 25 the medium under pressure entering at 26 passes through the nest of tubes 20, by way of a number of flues. The heated-up medium under pressure is discharged at 27. The heating gases enter the tubes 20 at 28, pass through the same, transmitting heat to the pressure medium, and leave the heat exchanger through the hood 29 and the tubular connecting branch 30. In this case the expansion element 31 with the throttling rings 32, permitting an unimpeded longitudinal expansion of the nest of tubes 20 with the plate 21 and the hood 29, in relation to the wall 23 of the vessel, is accommodated in the tubular connecting piece 30, i. e., in a constructional element having substantially smaller dimensions than the vessel itself. Consequently, the control of the function of the individual constructional elements is facilitated. It is also shown in this case that the passage of part of the medium under pressure through the throttling stages which is required for the reduction of the pressure, need not necessarily be a loss, but it is also possible, as far as the pressure is still above atmospheric pressure, to lead off the pressure medium and use it for any suitable purposes.

According to Fig. 4, membrane bellows 33 are used for the packing which in this case owing to their smaller dimensions can be designed in such a manner that they are able both to take up the required longitudinal expansion and to stand the interior pressure of the heat exchanger.

Fig. 5 shows how the radial expansion between the nest of tubes and the wall of the vessel can be compensated according to a similar principle. The lower plate 22 of the nest of tubes 20 is seated in an annular groove 34 formed by the shell-side flange 35 and the flange 36 at the lower inlet side, bearing with its high weight on the lower surface. The packing is again formed by labyrinth packings with gradual decrease of pressure towards the outside. The leaking pressure medium is led off through the bores 37. The bottom plate 22 is able to expand in a radial direction, independently of the wall or shell 23 of the vessel.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described the invention, what is claimed is:

1. A heat-exchanging device adapted for containing fluid under high pressure and having parts of different coefficient of expansion subject to widely varying temperatures and in which the differing expansions are compensated for while maintaining said high pressure within said device comprising in combination a sliding joint between said differently expanding parts exposed to said high pressure fluid, packing and throttling means in said joint for obstructing the passage of said fluid through said joint for reducing the escape of said fluid leaking through said joint, an expansible bellows forming a low pressure expansion chamber connected with said joint and separated from said high pressure fluid by said packing and throttling means for retaining fluid leaking through said joint, and exhaust means connecting said chamber to the outside atmosphere for bleeding off fluid leaking through said joint into said chamber to maintain no more than said low pressure in said chamber.

2. A heat-exchanging device adapted for fluid under high pressure and having parts subject to different extents of heat expansion and in which the differing expansions are compensated for while maintaining said high pressure within said device comprising in combination a sliding joint between said differently expanding parts exposed to said high pressure fluid, packing and pressure throttling means in said joint for obstructing the passage of said fluid through said joint to reduce the pressure of fluid leaking through said joint, said packing and throttling means including a plurality of successive tortuous expansion chambers, an expansible bellows adapted to withstand a maximum pressure less than said high pressure and forming a final low pressure expansion chamber connected with said joint and separated from said high pressure fluid by said packing and throttling means for retaining fluid leaking through said joint and controlled exhaust means connecting said bellows to the outside atmosphere for bleeding off fluid leaking through said joint into said bellows to maintain no more than said low pressure in said bellows.

3. A heat-exchanging device adapted for containing fluid under high pressure and having parts subject to differing extents of heat expansion and in which the differing expansions are compensated for while maintaining said high pressure within said device comprising in combination a sliding joint between said differently expanding parts exposed to said high pressure fluid, packing and pressure throttling means in said joint for obstructing the passage of said fluid through said joint to reduce the pressure of fluid leaking through said joint, said packing and throttling means including a plurality of chambers and elastically deformable packing rings between said chambers, and expansible bellows forming a final low pressure expansion chamber connected with said joint and separated from said high pressure fluid by said packing and throttling means for retaining fluid leaking through said joint, said rings being adapted to be urged into tighter sealing arrangement by the application of increased pressure to said joint, and exhaust means connecting said bellows to the outside atmosphere for bleeding off fluid leaking through said joint into said bellows to maintain no more than said low pressure in said bellows.

4. A heat-exchanging device adapted for fluid under high pressure and having parts subject to differing extents of heat expansion and in which the differing expansions are compensated for while maintaining said high pressure within said device comprising in combination a sliding joint between said differently expanding parts exposed to said high pressure fluid, packing and pressure throttling means in said joint for obstructing the passage of said fluid through said joint to reduce the pressure of fluid leaking through said joint, said packing and throttling means including a plurality of successive tortuous expansion chambers, a final low pressure expansion chamber comprising a flexible bellows member interconnecting said differently expanding parts across said joint and separated from said high pressure fluid by said packing and throttling means for retaining fluid leaking through said joint, and controlled exhaust means connecting said chamber to the outside atmosphere for bleeding off fluid leaking through said joint into said chamber to maintain no more than said low pressure in said chamber.

5. A heat-exchanging device adapted for fluid under high pressure and having concentric cylindrical parts subject to differing extents of heat expansion and in which the differing expansions of said parts are compensated for while maintaining said high pressure within said device comprising in combination a sliding joint between said differently expanding parts exposed to said high pressure fluid, packing and pressure throttling means in said joint for obstructing the passage of said fluid through said joint to reduce the pressure of fluid leaking through said joint, said packing and throttling means including a plurality of successive tortuous expansion chambers, an expansible bellows adapted to withstand no more than a maximum pressure less than said high pressure and forming a final low pressure chamber connected with said joint and separated from said high pressure fluid by said packing and throttling means for retaining fluid leaking through said joint, and controlled exhaust means connecting said bellows to the outside atmosphere for bleeding off fluid leaking through said joint into said bellows to maintain no more than said low pressure in said bellows.

6. A heat-exchanging device adapted for fluid under high pressure and having concentric cylindrical parts subject to differing extents of heat expansion and in which the differing expansions of said parts are compensated for while maintaining said high pressure within said device comprising in combination a sliding joint between said differently expanding parts exposed to said high pressure fluid, packing and pressure throttling means in said joint for obstructing the passage of said fluid through said joint to reduce the pressure of fluid leaking through said joint, said packing and throttling means including a plurality of circumferential grooves around the outside surface of the inner of said concentrically cylindrical parts and a plurality of piston rings fitted into said grooves to form a plurality of labyrinth chambers, each of said rings having a smaller cross section than the groove in which it fits for compensating for radial and axial expansion of said inner cylindrical part, a final low pressure expansion chamber connected with said joint and separated from said high pressure fluid by said packing and throttling means, expansible bellows interconnecting said differently expanding parts across said joint, and exhaust means connecting said low pressure chamber to the outside atmosphere for bleeding off fluid leaking through said joint into said bellows to maintain no more than said low pressure in said bellows.

7. A heat-exchanging device adapted for fluid under high pressure and having concentric cylindrical parts subject to differing extents of heat expansion and in which the differing expansions of said parts are compensated for while maintaining said high pressure within said device comprising in combination a sliding joint between said differently expanding parts exposed to said high pressure fluid, packing and pressure throttling means in said joint for obstructing the passage of said fluid through said joint to reduce the pressure of fluid leaking through said joint, said packing and throttling means including a plurality of circumferential grooves around the outside surface of the inner of said concentrically cylindrical parts and a plurality of piston rings fitted into said grooves to form a plurality of labyrinth expansion chambers, each of said rings having a smaller cross section than the groove in which it fits for compensating for radial and axial expansion of said inner cylindrical part, a final low pressure expansion chamber connected with said joint and separated from said high pressure fluid by said packing and throttling means, an expansible bellows interconnecting said differently expanding parts across said joint and communicating with said final chamber, and exhaust means connecting said final chamber to the outside atmosphere for bleeding off fluid leaking through said joint into said bellows to maintain no more than said low pressure in said bellows, the diameter of said concentric cylindrical parts between which said joint is located being substantially less than the diameter of the remainder of said vessel for increasing the curvature and decreasing the area of said joint to provide greater sealing efficiency in said packing.

8. A vessel for fluid under high pressure having parts subject to differing extents of heat expansion and in which the differing expansions are compensated for while maintaining said high pressure in said vessel comprising in combination a sliding joint between portions of said differently expanding parts having substantially planar surfaces, said joint being exposed to said high pressure fluid, packing and pressure throttling means in said joint for obstructing the passage of said fluid through said joint to reduce to a small value the escape of said fluid leaking through said joint, said packing and throttling means including a plurality of labyrinth chambers and a final low pressure expansion chamber connected with said joint and separated from said high pressure fluid by said packing and throttling means for retaining fluid leaking through said joint, and controlled exhaust means connecting said chamber to the outside atmosphere for bleeding off fluid leaking through said joint into said chamber to maintain no more than said low pressure in said chamber.

9. A heat-exchanging device adapted for fluid under high pressure and having parts subject to differing extents of heat expansion and in which the differing expansions are compensated for while maintaining said high pressure within said device comprising in combination a sliding joint between a stationary part of said vessel and a differently expanding part which moves during heat expansion, said joint being exposed to said high pressure fluid, packing and pressure throttling means in said joint for obstructing passage of said fluid through said joint to reduce the pressure of fluid through said joint, said packing and throttling means including a plurality of tortuous expansion chambers on said moving part, an expansible bellows interconnecting said parts and forming a final low pressure expansion chamber connected with said joint and separated from said high pressure fluid by said packing and throttling means for retaining fluid leaking through said joint, and exhaust means connecting said bellows to the outside atmosphere for bleeding off fluid leaking through said joint into said bellows to maintain no more than said low pressure in said bellows.

CHRISTIAN SCHÖRNER.
MAX ROTHEMUND.

References Cited in the file of this patent
UNITED STATES PATENTS

| Number | Name | Date |
|---|---|---|
| 553,509 | Burnham | Jan. 28, 1896 |
| 1,626,869 | O'Donnell | May 3, 1927 |
| 1,780,837 | Nott | Nov. 4, 1930 |
| 1,884,209 | Potter | Oct. 25, 1932 |
| 2,232,936 | Bimpson | Feb. 25, 1941 |
| 2,506,293 | Copeland | May 2, 1950 |

FOREIGN PATENTS

| Number | Country | Date |
|---|---|---|
| 4,109 | Great Britain | Mar. 25, 1899 |
| 29,646 | Netherlands | Apr. 15, 1933 |
| 273,605 | Great Britain | July 12, 1927 |